Patented May 17, 1927.

1,629,161

UNITED STATES PATENT OFFICE.

WILLY O. HERRMANN AND WOLFRAM HAEHNEL, OF MUNICH, GERMANY, ASSIGNORS TO CONSORTIUM FUER ELEKTROCHEMISCHE INDUSTRIE, OF MUNICH, GERMANY.

PROCESS FOR STABILIZING COLLOIDAL SYSTEMS.

No Drawing. Application filed July 1, 1926, Serial No. 119,923, and in Germany July 17, 1925.

The object of this invention is the stabilization of colloidal systems through the addition of a protective colloid. In accordance with the processes of this invention sols and particularly hydrosols containing metals, hydroxides, sulphides, oils or other dispersoids may be stabilized, i. e. precipitation or coagulation may be prevented, by additions of polymerized vinyl alcohol. Polymerized vinyl alcohol is a new composition of matter the preparation of which is described in our copending application Serial No. 44,410, filed July 17, 1925.

This polymer can be obtained by polymerizing vinyl compounds and decomposing these polymerized vinyl compounds by the action of alkaline reagents, e. g. polymerized vinyl acetate on treatment with alcoholic potash gives directly the polymerized vinyl alcohol as a voluminous powder. As an example of this preparation the following is given:

60 grams of potassium hydroxide are dissolved in 50 grams of ethyl alcohol in a vessel equipped with a stirrer. To this solution is added, with thorough agitation, 80 grams of ground polymerized vinyl acetate. After agitating about half an hour the precipitated polymer of vinyl alcohol is separated on a filter and dried.

This polymer of vinyl alcohol is a water soluble powder without odor, of white color and has the formula $(CH_2:CHOH)_n$. Determination of the molecular weight according to the osmotic pressure method gives figures between 780 and 870 according to the formula $(CH_2:CHOH)_{18}$ to $(CH_2:CHOH)_{20}$. We do not, however, wish to be limited to those polymers having this degree of polymerization. Solutions of polymerized vinyl alcohol are suitable for the preparation or stabilizations of colloidal systems in various degrees of dispersion and in various dispersing mediums.

This discovery can be utilized by merely adding the polymerized vinyl alcohol solution to a colloidal solution prepared by any of the usual methods, or, the colloid may be prepared in a solution of polymerized vinyl alcohol.

The polymerized vinyl alcohol protects the system against the action of electrolytes. Stable colloidal solutions of gold, silver, platinum, copper, metal hydroxides, metal sulphides and the like have been prepared by utilizing solutions of polymerized vinyl alcohol. Furthermore, stabilized suspensions of finely divided materials and emulsions of liquids have been secured by the use of polymerized vinyl alcohol in the dispersing medium.

*Example I.*

0.5 grams gold chloride were dissolved in a few drops of water and added to 250 cc. of a 5% aqueous solution of polymerized vinyl alcohol. 20 cc. of commercial formaldehyde solution and 10 cc. of 2N sodium carbonate solution were now added. The purple red colour of the colloidal gold was immediately formed; a highly stable gold colloidal results. This colloidal solution was now purified by dialysis. This solution was absolutely unaltered after one year of inspection.

*Example II.*

5 grams of chromic chloride is dissolved in a minimum amount of water and this solution added to 250 cc. of a 10% aqueous solution of polymerized vinyl alcohol. Aqueous ammonia is now added till the solution has a distinct odor of ammonia after being well stirred. The chromic hydroxide formed does not precipitate but remains as a finely divided suspension. This suspension can be purified by dialysis. Such a purified suspension showed no alteration during a year of inspection.

*Example III.*

An aqueous colloidal gold solution was prepared by an electric arc. A 10% aqueous solution of polymerized vinyl alcohol was added and a stable colloidal system resulted.

*Example IV.*

4 grams iron chloride were dissolved in a minimum of water and then added to a 20% aqueous solution of polymerized vinyl alcohol. Ammonium sulphide was now added in excess. No precipitation occurred but a fine suspension formed which was purified by dialysis.

*Example V.*

A jelly was prepared from 10 grams polymerized vinyl alcohol and a small amount of water. This was now mixed with 8 grams trichlorethylene and finally 82 grams of water were stirred in. A nearly clear emulsion was formed which was stable.

The protective power of the polymerized vinyl alcohol in colloidal solutions is very large; the amounts of this to be used in any solution will vary and we do not wish to be limited to any exact proportions nor to the examples given.

What we claim is:

1. A method of stabilizing a colloidal system which comprises mixing polymerized vinyl alcohol with said system.

2. A method of stabilizing an aqueous colloidal system which comprises adding an aqueous solution of polymerized vinyl alcohol to said hydrosol.

3. Method of prevention of the precipitation or coagulation of a dispersoid which comprises adding polymerized vinyl alcohol to the colloidal system.

4. Method of prevention of the precipitation or coagulation of a dispersoid in an aqueous colloidal system which comprises adding thereto an aqueous solution of polymerized vinyl alcohol.

5. Method of prevention of the precipitation or coagulation of a metallic dispersoid which comprises adding polymerized vinyl alcohol to the colloidal system.

6. Method of stabilizing an aqueous colloidal gold solution which comprises adding an aqueous solution of polymerized vinyl alcohol thereto.

7. As a product of manufacture a colloidal solution containing polymerized vinyl alcohol as a protective colloid.

8. As a product of manufacture a hydrosol containing polymerized vinyl alcohol as a protective colloid.

WILLY O. HERRMANN.
WOLFRAM HAEHNEL.